US012123979B2

(12) United States Patent
Mao et al.

(10) Patent No.: US 12,123,979 B2
(45) Date of Patent: Oct. 22, 2024

(54) DUAL-WAVELENGTH HIGH-SPECTRAL RESOLUTION LIDAR SYSTEM BASED ON DUAL-STAGE VIRTUAL IMAGE PHASED ARRAY

(71) Applicants: SECOND INSTITUTE OF OCEANOGRAPHY, MINISTRY OF NATURAL RESOURCES, Hangzhou (CN); SHANGHAI JIAO TONG UNIVERSITY, Shanghai (CN)

(72) Inventors: Zhihua Mao, Hangzhou (CN); Dapeng Yuan, Hangzhou (CN); Peng Chen, Hangzhou (CN); Bangyi Tao, Hangzhou (CN); Haiqing Huang, Hangzhou (CN); Qiankun Zhu, Hangzhou (CN)

(73) Assignees: SECOND INSTITUTE OF OCEANOGRAPHY, MINISTRY OF NATURAL RESOURCES, Hangzhou (CN); SHANGHAI JIAO TONG UNIVERSITY, Shanghai (CN)

( * ) Notice: Subject to any disclaimer, the term of this patent is extended or adjusted under 35 U.S.C. 154(b) by 871 days.

(21) Appl. No.: 17/222,986

(22) Filed: Apr. 5, 2021

(65) Prior Publication Data
US 2022/0163640 A1 May 26, 2022

(30) Foreign Application Priority Data
Nov. 20, 2020 (CN) .......................... 202011313723.9

(51) Int. Cl.
*G01S 7/4863* (2020.01)
*G01S 7/481* (2006.01)
*G01S 17/89* (2020.01)
*G02B 27/10* (2006.01)

(52) U.S. Cl.
CPC ............ *G01S 7/4863* (2013.01); *G01S 7/481* (2013.01); *G01S 17/89* (2013.01); *G02B 27/1006* (2013.01)

(58) Field of Classification Search
None
See application file for complete search history.

(56) References Cited

FOREIGN PATENT DOCUMENTS

| CN | 110673156 A | * | 1/2020 | ............. G01N 21/53 |
| CN | 111142121 A | * | 5/2020 | ............. G01K 11/00 |

* cited by examiner

*Primary Examiner* — Luke D Ratcliffe
(74) *Attorney, Agent, or Firm* — W&G Law Group

(57) ABSTRACT

The present disclosure discloses a dual-wavelength high-spectral resolution lidar system based on a dual-stage virtual image phased array. The system includes a dual-wavelength vertically polarized light emission system, first to sixth beam splitting systems, a first photodetector, a telescope, a first band-pass filter, a second band-pass filter, a second photodetector, a first dual-stage virtual image phased array system, a third photodetector, a first ICCD acquisition system, a fourth photodetector, a second dual-stage virtual image phased array system, a fifth photodetector, a second ICCD acquisition system, and a timing controller. The system has abilities of real-time detection of subsurface information in an ocean, phytoplankton vertical layered structure, vertical profile distribution of temperature and salinity of sea water, and spatiotemporal variabilities of the mixed layer depth, thereby effectively solving existing problems and shortcomings in a current ocean exploration technology, to provide a system solution for further realization of a transparent ocean.

5 Claims, 1 Drawing Sheet

DUAL-WAVELENGTH HIGH-SPECTRAL RESOLUTION LIDAR SYSTEM BASED ON DUAL-STAGE VIRTUAL IMAGE PHASED ARRAY

TECHNICAL FIELD

The present disclosure relates to the field of marine optical detection, and in particular to a dual-wavelength high-spectral resolution lidar system based on a dual-stage virtual image phased array and an inversion method.

BACKGROUND

Around 71% of the earth is the ocean. Exploring the ocean is extremely important for studying evolution of the earth and change of global climate, and the ocean is also a main battlefield for national defense and national economic construction. Passive ocean color satellite remote sensing plays an irreplaceable role in observing global carbon cycle, primary productivity, and ocean and coastal environmental changes, however, this observation technology cannot provide a sufficient vertical distribution structure of marine environmental parameters, nor can it perform day and night observations throughout the day. With development of laser technology, ocean lidar has advantages such as high spatiotemporal resolution, continuous observation day and night, and detection of vertical ocean profiles. At present, Mie scattering lidar and high-spectral resolution lidar are main technical means for studying marine environmental parameters. However, there are also some problems in the above system methods, for example, a Mie scattering lidar equation needs to assume a lidar ratio to solve a problem of two unknowns in one equation, which also results in that inversion accuracy cannot be effectively guaranteed; an F-P interferometer and an iodine molecular absorption cell used in a high-spectral resolution lidar system have problems such as long scanning time, high optical path alignment requirements, and only being used in the 532 nm band.

SUMMARY

Inadequate targeting of existing technologies, the present disclosure discloses a dual-wavelength high-spectral resolution lidar system based on a dual-stage virtual image phased array and an inversion method, and the system adopts a dual-stage virtual image phased array to separate elastic scattering and Brillouin scattering in backscattered signals, adopts dual-wavelength emission laser-light for optical characteristics of case I water and case II water, to focus on detecting subsurface information in the ocean, vertical layered structures of phytoplankton, vertical profile distribution of sea temperature and salinity, and spatiotemporal variabilities of the mixed layer depth.

An object of the present disclosure is achieved through following technical solutions.

An embodiment of the present disclosure provides a dual-wavelength high-spectral resolution lidar system based on a dual-stage virtual image phased array, and the system includes:

a dual-wavelength vertically polarized light emission system for emitting laser light of two different wavelengths;

a first beam-splitting system including a first beam splitter and a first reflector, wherein the first beam splitter is used to split the laser light into two beams, one of which is received by a first photodetector, and the other one is incident into sea water through a first reflector, to generate a backscattered signal;

a telescope, for receiving the backscattered signal;

a second beam-splitting system including a second reflector and a second beam splitter, wherein after the backscattered signal is received by the telescope, it is reflected by the second reflector to the second beam splitter, and the second beam splitter splits the light beam into two beams, one of which enters a third beam splitting system through a first band-pass filter, and the other one enters a fifth beam splitting system through a second band-pass filter; and a third beam splitting system including a third beam splitter and a third reflector, wherein the third beam splitter splits the light beam into two beams, one of which is received by a second photodetector through the third reflector, and the other one is incident onto the first dual-stage virtual image phased array system;

wherein the first dual-stage virtual image phased array system includes a first half-wave plate, a first cylindrical lens, a first polarization beam splitter, a first virtual image phased array, a second half-wave plate, a second polarization beam splitter, a fourth reflector, a second cylindrical lens, a first spatial wave-filter, a first spherical lens, a fifth reflector, a sixth reflector, a second spherical lens, a second spatial wave-filter, and a third spherical lens; a vertically polarized light beam passes through the first half-wave plate to become horizontally polarized light, and then the horizontally polarized light passes through the first cylindrical lens and the first polarization beam splitter to be incident onto the first virtual image phased array, then the horizontally polarized light passes through the second half-wave plate to become vertically polarized light, and then the vertically polarized light is reflected by the second polarization beam splitter and the fourth reflector, and after sequentially passing through the second cylindrical lens, the first spatial wave-filter, the first spherical lens, the fifth reflector, the sixth reflector and first polarization beam splitter, it enters the first virtual image phased array again, and sequentially passes through the second half-wave plate, the polarization beam splitter, the second spherical lens, the second spatial wave-filter, and the third spherical lens and then enters a fourth beam splitting system, and then a fourth beam splitter in the fourth beam splitting system splits the light beam into two beams, one of which is incident onto a third photodetector, and the other one is received by a first ICCD acquisition system;

the fifth beam splitting system includes a fifth beam-splitter and a seventh reflector, the fifth beam splitter splits the light beam into two beams, one of which is incident onto a fourth photodetector, and the other one is incident onto a second dual-stage virtual image phased array system through the seventh reflector;

the second dual-stage virtual image phased array system includes a third half-wave plate, a third cylindrical lens, a third polarization beam splitter, a second virtual image phased array, a fourth half-wave plate, a fourth polarization beam splitter, an eighth reflector, a fourth cylindrical lens, a third spatial wave-filter, a fourth spherical lens, a ninth reflector, a tenth reflector, a fifth spherical lens, a fourth spatial wave-filter, and a sixth spherical lens; a vertically polarized beam passes through the third half-wave plate to become horizontally polarized light, the horizontally polarized light is incident into the second virtual image phased array after passing through the third cylindrical lens and the third polarization beam splitter, then the horizontally polarized light passes through the fourth half-wave plate to become vertically polarized light, and then it is reflected by the fourth polarization beam splitter and the eighth reflector, and then sequentially passes through the fourth cylindrical lens, the third spatial wave-filter, the fourth spherical lens, the ninth reflector, the tenth reflector and the third polarization beam splitter, and then is incident onto the second virtual image phased array again, and then it sequentially passes through the fourth half-wave plate, the fourth polarization beam splitter, the fifth spherical lens, the fourth spatial wave-filter, and the sixth spherical lens, and then enters a sixth beam splitting system;

the sixth beam splitting system includes a sixth beam-splitter, which splits the light beam into two beams, one of which is incident onto a fifth photodetector, and the other one is received by a second ICCD acquisition system; and the dual-wavelength high-spectral resolution lidar system further includes: a computer, for displaying and processing, in real time, data received by the first ICCD acquisition system and the second ICCD acquisition system; and a timing controller, for controlling time delay of the first ICCD acquisition system and the second ICCD acquisition system.

Further, the dual-wavelength vertically polarized light emission system emits laser light having wavelengths of 488 nm and 532 nm, respectively.

Further, the first band-pass filter has a center wavelength of 532 nm, a transmittance larger than 90%, a short-wave cut-off range of 200-512 nm, and a long-wave cut-off range of 552-1200 nm; the second band-pass filter has a center wavelength of 488 nm, a transmittance larger than 90%, a short-wave cut-off range of 200-460 nm, and a long-wave cut-off range of 500-1200 nm.

Further, the first virtual image phased array and the second virtual image phased array have a free spectral range of 0-18 GHz.

An embodiment of the present disclosure provides an inversion method based on ocean environment parameters of the lidar system described above, the method incudes:

a step S1: receiving, by the second photodetector and at a laser-light receiving channel of 532 nm, a sum of Mie scattering and Rayleigh scattering signal intensity $P_{E1}$ and Brillouin scattering signal intensity $P_{B1}$ of a light beam; receiving, by the third photodetector, the Brillouin scattering signal intensity $P_{B1}$; and obtaining the Mie scattering and Rayleigh scattering signal intensity $P_{E1}$ by subtracting the Brillouin scattering signal intensity $P_{B1}$ from the sum of Mie scattering and Rayleigh scattering signal intensity $P_{E1}$ and Brillouin scattering signal intensity $P_{B1}$; and receiving, by the fourth photodetector and at a laser-light receiving channel of 488 nm, a sum of Mie scattering and Rayleigh scattering signal intensity $P_{E2}$ and Brillouin scattering signal intensity $P_{B2}$; receiving, by the fifth photodetector, the Brillouin scattering signal intensity $P_{B2}$; and obtaining the Mie scattering and Rayleigh scattering signal intensity $P_{E2}$ by subtracting the Brillouin scattering signal intensity $P_{B2}$ from the sum of Mie scattering and Rayleigh scattering signal intensity $P_{E2}$ and Brillouin scattering signal intensity $P_{B2}$;

a step S2: obtaining an attenuation coefficient α of the lidar signal in sea water for each of the two laser-light receiving channels based on a following calculation formula:

$$P_B(z) = C_B \beta_B^\pi(z) \exp[-2\int_0^z \alpha(z')dz']$$

where, a subscript B represents Brillouin scattering, $\beta_B^\pi$ represents a backward Brillouin scattering coefficient, and α represents an attenuation coefficient of the lidar signal in the sea water; and z represents a detection depth of laser-light;

a step S3: obtaining a backscattering coefficient $\beta_B^\pi$ of suspended particles in the sea water for each of the two laser-light receiving channels based on a following calculation formula:

$$P_E(z) = C_E[\beta_M^\pi(z) + \beta_P^\pi(z)] \exp[-2\int_0^z \alpha(z')dz']$$

where, $C_E$ represents a system constant of an elastic scattering channel, $\beta_M^\pi$ represents a backscattering coefficient of water molecules, and $\beta_P^\pi$ represents a backscattering coefficient of the suspended particles; and a step S4: for each of the two laser-light receiving channels, inverting ocean subsurface information and a phytoplankton vertical layered structure based on a vertical profile of the backscattering coefficient $\beta_P^\pi$ of the suspended particles.

The beneficial effects of the present disclosure are as follows:

The dual-wavelength high-spectral resolution lidar system of the dual-stage virtual image phased array of the present disclosure has an ability to detect case I waters and case II waters in the ocean, and it can detect, through received elastic scattering signals and Brillouin scattering signals, the subsurface information in the ocean, the vertical layered structures of phytoplankton, the vertical profile distribution of sea temperature and salinity, and spatiotemporal variabilities of the mixed layer depth.

Through a design of a circular optical path of the virtual image phased array system, space occupied by the system is reduced and an extinction ratio is increased.

Through designs of the dual-wavelength and the dual-stage virtual image phased arrays, the two systems can be mutually verified, to improve the inversion accuracy of lidar.

The inversion method of the present disclosure uses dual-wavelength channels to establish a joint equation, to further improve the inversion accuracy of marine environmental parameters.

The present disclosure can effectively solve the problems and defects existing in the current ocean exploration technical means, to provide a system solution for further realizing a transparent ocean.

Figure 1:
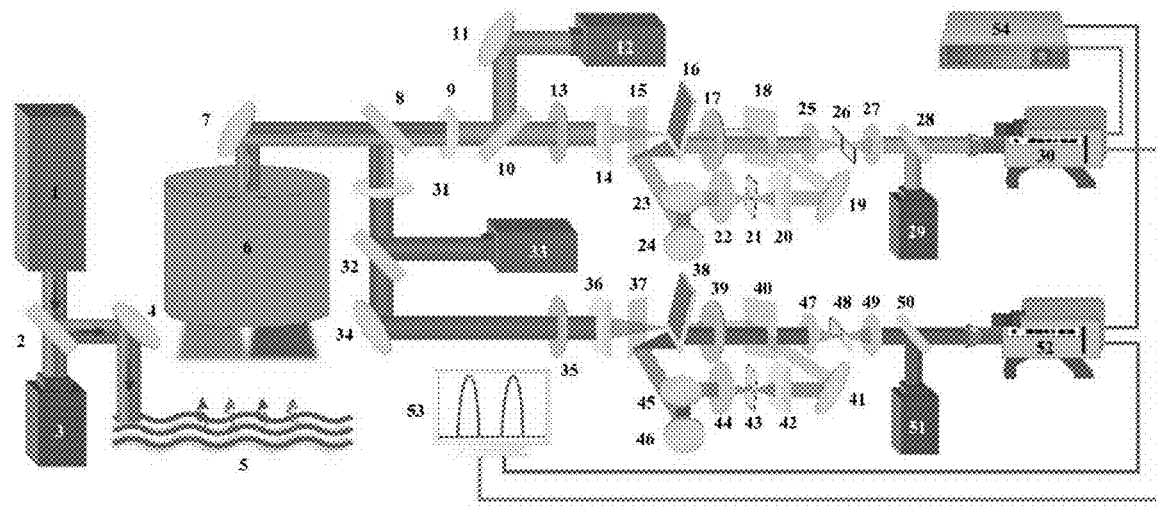
FIG. 1 is a system schematic diagram of a dual-wavelength high-spectral resolution lidar system based on a dual-stage virtual image phased array of the present disclosure.

In the drawing, dual-wavelength vertically polarized light emission system 1, first beam splitter 2, first photodetector 3, first reflector 4, sea water 5, telescope 6, second reflector 7, second beam splitter 8, first band-pass filter 9, third beam splitter 10, third reflector 11, second photodetector 12, first half-wave plate 13, first cylindrical lens 14, first polarization beam splitter 15, first virtual image phased array 16, second half-wave plate 17, second polarization beam splitter 18, fourth reflector 19, second cylindrical lens 20, first spatial wave-filter 21, first spherical lens 22, fifth reflector 23, sixth reflector 24, second spherical lens 25, second spatial wave-filter 26, third spherical lens 27, fourth beam splitter 28, third photodetector 29, first ICCD acquisition system 30, second band-pass filter 31, fifth beam splitter 32, fourth photodetector 33, seventh reflector 34, third half-wave plate 35, third cylindrical lens 36, third polarization beam splitter 37, second virtual image phased array 38, fourth half-wave plate 39, fourth polarization beam splitter 40, eighth reflector 41, fourth cylindrical lens 42, third spatial wave-filter 43, fourth spherical lens 44, ninth reflector 45, tenth reflector 46, fifth spherical lens 47, fourth spatial wave-filter 48, sixth spherical lens 49, sixth beam splitter 50, fifth photodetector 51, second ICCD acquisition system 52, computer 53, and timing controller 54.

DESCRIPTION OF EMBODIMENTS

The present disclosure will be described in detail below based on the drawings and preferable embodiments, and the object and effects of the present disclosure will become more apparent. The specific embodiments described herein are only used to explain the present disclosure, but not to limit the present disclosure.

As shown in FIG. 1, a dual-wavelength hyperspectral lidar system based on a dual-stage virtual image phased array of the present disclosure, including: a dual-wavelength vertically polarized light emission system 1, a first beam splitter 2, a first photodetector 3, a first reflector 4, sea water 5, a telescope 6, a second reflector 7, a second beam splitter 8, a first band-pass filter 9, a third beam splitter 10, a third reflector 11, a second photodetector 12, a first half-wave plate 13, a first cylindrical lens 14, a first polarization beam splitter 15, a first virtual image phased array 16, a second half-wave plate 17, a second polarization beam splitter 18, a fourth reflector 19, a second cylindrical lens 20, a first spatial wave-filter 21, a first spherical lens 22, a fifth reflector 23, a sixth reflector 24, a second spherical lens 25, a second spatial wave-filter 26, a third spherical lens 27, a fourth beam splitter 28, a third photodetector 29, a first ICCD acquisition system 30, a second band-pass filter 31, a fifth beam splitter 32, a fourth photodetector 33, a seventh reflector 34, a third half-wave plate 35, a third cylindrical lens 36, a third polarization beam splitter 37, a second virtual image phased array 38, a fourth half-wave plate 39, a fourth polarization beam splitter 40, an eighth reflector 41, a fourth cylindrical lens 42, a third spatial wave-filter 43, a fourth spherical lens 44, a ninth reflector 45, a tenth reflector 46, a fifth spherical lens 47, a fourth spatial wave-filter 48, a sixth spherical lens 49, a sixth beam splitter 50, a fifth photodetector 51, a second ICCD acquisition system 52, a computer 53, and a timing controller 54.

The dual-wavelength vertically polarized light emission system 1 emits vertically polarized light having wavelengths of 488 nm and 532 nm; laser-light having the wavelength of 488 nm preferentially detects optical characteristics of case I waters, and a laser pulse has energy of 5 mJ, a repetition frequency of 10 Hz, and a line width of 90 MHz; laser-light having a wavelength of 532 nm preferentially detects optical characteristics of case II waters, and a laser pulse has energy of 5 mJ, a repetition frequency of 10 Hz, and a line width of 90 MHz.

The first beam splitter 2 and the first reflector 4 constitute a first beam-splitting system, and the first beam splitter 2 is used to split the vertically polarized light emitted by the dual-wavelength vertically polarized light emission system 1 into two beams, one of which is received by the first photodetector 3, to monitor energy stability of the incident laser-light; the other beam is incident into the sea water 5 through the first reflector 4, to generate a backscattered signal; the backscattered signal is received by the telescope 6 and then enters a second beam-splitting system composed of the second reflector 7 and the second beam splitter 8, the light beam is reflected by the second reflector 7 to the second beam splitter 8, and the second beam splitter 8 splits the light beam into two beams, one of which enters a third beam splitting system through the first band-pass filter 9, and the other one enters the fifth beam splitting system through the second band-pass filter 31.

The third beam splitting system includes the third beam splitter 10 and the third reflector 11, and the third beam splitter 10 divides the light beam into two beams, one of which is received by the second photodetector 12 after passing through the third reflector 11 (this channel receives Mie scattering, Rayleigh scattering and Brillouin scattering signals); the other beam is incident onto the first dual-stage virtual image phased array system.

The first dual-stage virtual image phased array system includes the first half-wave plate 13, the first cylindrical lens 14, the first polarization beam splitter 15, the first virtual image phased array 16, the second half-wave plate 17, the second polarization beam splitter 18, the fourth reflector 19, the second cylindrical lens 20, the first spatial wave-filter 21, the first spherical lens 22, the fifth reflector 23, the sixth reflector 24, the second spherical lens 25, the second spatial wave-filter 26, and the third spherical lens 27. A vertically polarized light beam passes through the first half-wave plate 13 to become horizontally polarized light, and then it passes through the first cylindrical lens 14 and the first polarization beam splitter 15 to enter the first virtual image phased array 16, then the horizontally polarized light passes through the second half-wave plate 17 to become vertically polarized light, and it is reflected by the second polarization beam splitter 18 and the fourth reflector 19, and after sequentially passing through the second cylindrical lens 20, the first spatial wave-filter 21, the first spherical lens 22, the fifth reflector 23, the sixth reflector 24 and first polarization beam splitter 15, it enters the first virtual image phased array 16 again, that is, to form, based on a single cavity, a dual-stage virtual image phased array through design of an optical path, after that, the beam sequentially passes through the second half-wave plate 17, the polarization beam splitter 18, the second spherical lens 25, the second spatial wave-filter 26, and the third spherical lens 27 again and then enters a fourth beam splitting system, the fourth beam splitting system is the fourth beam splitter 28, and it splits the light beam into two beams, one of which is incident onto the third photodetector 29 (this channel receives the Brillouin scattering signal); the other beam is received by the first ICCD acquisition system 30 (this channel receives frequency shift and linewidth information of a Brillouin scattering spectrum).

A fifth beam splitting system includes the fifth beam-splitter 32 and the seventh reflector 34, and the fifth beam splitter 32 splits the light beam into two beams, one of which is incident onto the fourth photodetector 33 (this channel receives the Mie scattering, Rayleigh scattering and Brillouin scattering signals), and the other one is incident onto the second dual-stage virtual image phased array system through the seventh reflector 34.

The second dual-stage virtual image phased array system includes the third half-wave plate 35, the third cylindrical lens 36, the third polarization beam splitter 37, the second virtual image phased array 38, the fourth half-wave plate 39, the fourth polarization beam splitter 40, an eighth reflector 41, the fourth cylindrical lens 42, the third spatial wave-filter 43, the fourth spherical lens 44, the ninth reflector 45, the tenth reflector 46, the fifth spherical lens 47, the fourth spatial wave-filter 48, and the sixth spherical lens 49; the vertically polarized beam passes through the third half-wave plate 35 to become horizontally polarized light, the horizontally polarized light is incident to the second virtual image phased array 38 through the third cylindrical lens 36 and the third polarization beam splitter 37, then the horizontally polarized light passes through the fourth half-wave plate 39 to become vertically polarized light, and it is reflected by the fourth polarization beam splitter 40 and the eighth reflector 41, sequentially passes through the fourth cylindrical lens 42, the third spatial wave-filter 43, the fourth spherical lens 44, the ninth reflector 45, the tenth reflector 46 and the third polarization beam splitter 37, and is incident onto the second virtual image phased array 38 again, that is, to function, based on the single cavity, as a dual-stage virtual image phased array through design of an optical path, and finally, the light beam sequentially passes through the fourth half-wave plate 39, the fourth polarization beam splitter 40, the fifth spherical lens 47, the fourth spatial wave-filter 48, and the sixth spherical lens 49, and then enters a sixth beam splitting system; the sixth beam splitting system is the sixth beam-splitter 50, and it divides the light beam into two beams, one of which is incident onto the fifth photodetector 51 (this channel receives the Brillouin scattering signal); the other beam is received by the second ICCD acquisition system 52 (this channel receives the frequency shift and linewidth information of the Brillouin scattering spectrum).

The computer 53 displays and processes, in real time, data received by the first ICCD acquisition system 30 and the second ICCD acquisition system 52.

The timing controller 54 controls time delay of the first ICCD acquisition system 30 and the second ICCD acquisition system 52.

Here, the first band-pass filter 9 has a center wavelength of 532 nm, a transmittance larger than 90%, a short-wave cut-off range of 200-512 nm, and a long-wave cut-off range of 552-1200 nm. The second band-pass filter 31 has a center wavelength of 480 nm, a transmittance larger than 90%, a short-wave cut-off range of 200-460 nm, and a long-wave cut-off range of 500-1200 nm.

In order to separate the elastic scattering and Brillouin scattering signals, the first virtual image phased array 16 and the second virtual image phased array 38 have reflectivity larger than 99.9% at incident surfaces, reflectivity being about 95% at emission surfaces, cavity lengths of 5 mm, and free spectral ranges of 0-18 GHz.

In order to collect the Brillouin scattering signal more accurately, gate widths of the first ICCD acquisition system and the second ICCD acquisition system are larger than or equal to 2 ns.

An inversion method based on ocean environment parameters of the above lidar system specifically includes following steps.

At step S1, at a laser-light receiving channel of 532 nm, a sum of Mie scattering and Rayleigh scattering signal intensity $P_{E1}$ and Brillouin scattering signal intensity $P_{B1}$ of a light beam is received by the second photodetector 12, the first virtual image phased array system separates the elastic scattered and Brillouin scattered light and further filters out the elastic scattered light $P_{E1}$, the Brillouin scattering signal intensity $P_{B1}$ is received by the third photodetector 29, and the two are subtracted to obtain the Mie scattering and Rayleigh scattering signal intensity $P_{E1}$;

at a laser-light receiving channel of 488 nm, a sum of Mie scattering and Rayleigh scattering signal intensity $P_{E2}$ and Brillouin scattering signal intensity $P_{B2}$ is received through the fourth photodetector 33, the second virtual image phased array system separates the elastic scattered and Brillouin scattered light and further filters out the elastic scattered light $P_{E2}$, the Brillouin scattering signal intensity $P_{B2}$ is received by the fifth photodetector 51, and the two are subtracted to obtain the Mie scattering and Rayleigh scattering signal intensity $P_{E2}$.

Figure 2:
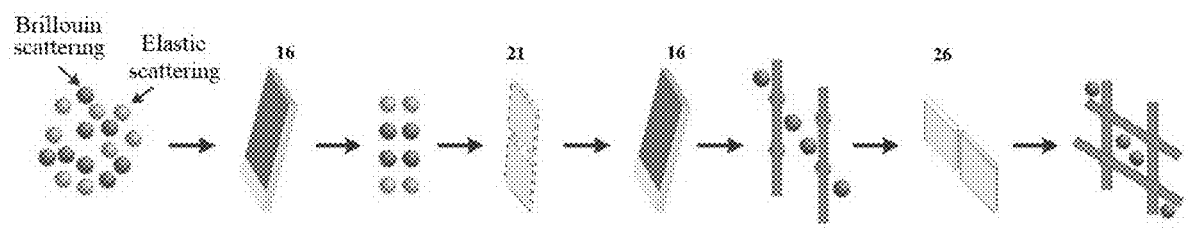
FIG. 2 is a schematic diagram of a dual-stage virtual image phased array system.

The first virtual image phased array system 1 is taken as an example to illustrate a working principle of the virtual image phased array system. As shown in FIG. 2, the elastic scattering and the Brillouin scattering in the backscattered signal of the lidar are incident onto the first virtual image phased array 16, light of different frequencies is reflected multiple times in the cavity and divided into a plurality of optical channels, each of the optical channels has a constant displacement, beams of different frequencies are separated to form a beam phased array, then the beam array enters the first virtual image phased array 16 again after passing through the first spatial wave-filter 21 and a circular optical path, in this case, the first spatial wave-filter 21 filters out the elastic scattered light forming crosstalk in a vertical direction, and the second spatial wave-filter 26 filters out the elastic scattered light forming crosstalk in a horizontal direction.

At step S2, for each of the two laser-light receiving channels, a following calculation formula is calculated to obtain an attenuation coefficient α of the lidar signal in the sea water:

$$P_B(z)=C_B\beta_B^\pi(z)\exp[-2\int_0^z\alpha(z')dz']$$

where, a subscript B represents Brillouin scattering, $\beta_B^\pi$ represents a backward Brillouin scattering coefficient, α represents an attenuation coefficient of the lidar signal in the sea water; and z represents a detection depth of laser-light.

At step S3, for each of the two laser-light receiving channels, a following calculation formula is calculated to obtain a backscattering coefficient $\beta_P^\pi$ of suspended particles in the sea water:

$$P_E(z)=C_E[\beta_M^\pi(z)+\beta_P^\pi(z)]\exp[-2\int_0^z\alpha(z')dz']$$

where, $C_E$ represents a system constant of the elastic scattering channel, $\beta_M^\pi$ represents a backscattering coefficient of water molecules, and $\beta_P^\pi$ represents a backscattering coefficient of the suspended particles.

At step S4, for each of the two laser-light receiving channels, ocean subsurface information and a phytoplankton vertical layered structure is inverted based on a vertical profile of the backscattering coefficient $\beta_P^\pi$ of the suspended particles.

Those of ordinary skill in the art can understand that the above are only preferred examples of the present disclosure and are not intended to limit the present disclosure. Although the present disclosure has been described in detail with reference to the foregoing examples, those skilled in the art can still modify the technical solutions described in the foregoing examples, or equivalently replace some of the technical features. All modifications and equivalent substitutions made within the spirit and principle of the present disclosure shall be included in the protection scope of the present disclosure.

What is claimed is:

1. A dual-wavelength high-spectral resolution lidar system based on a dual-stage virtual image phased array, wherein the system comprises:
a dual-wavelength vertically polarized light emission system (1) for emitting laser light of two different wavelengths;
a first beam-splitting system (1) comprising a first beam splitter (2) and a first reflector (4), wherein the first beam splitter (2) is used to split the laser light into two beams, one of which is received by a first photodetector (3), and the other one is incident into sea water (5) through a first reflector (4) to generate a backscattered signal;
a telescope (6) for receiving the backscattered signal generated by the sea water (5);
a second beam-splitting system comprising a second reflector (7) and a second beam splitter (8), wherein after the backscattered signal is received by the telescope (6), it is reflected by the second reflector (7) to the second beam splitter (8), and the second beam splitter (8) splits the light beam into two beams, one of which enters a third beam splitting system through a first band-pass filter (9), and the other one enters a fifth beam splitting system through a second band-pass filter (31); and
a third beam splitting system comprising a third beam splitter (10) and a third reflector (11), wherein the third beam splitter (10) splits the light beam into two beams, one of which is received by a second photodetector (12) through the third reflector (11), and the other one is incident onto a first dual-stage virtual image phased array system;
wherein the first dual-stage virtual image phased array system comprises a first half-wave plate (13), a first cylindrical lens (14), a first polarization beam splitter (15), a first virtual image phased array (16), a second half-wave plate (17), a second polarization beam splitter (18), a fourth reflector (19), a second cylindrical lens (20), a first spatial wave-filter (21), a first spherical lens (22), a fifth reflector (23), a sixth reflector (24), a second spherical lens (25), a second spatial wave-filter (26), and a third spherical lens (27); a vertically polarized light beam passes through the first half-wave plate (13) to become horizontally polarized light, and then the horizontally polarized light passes through the first cylindrical lens (14) and the first polarization beam splitter (15) to be incident onto the first virtual image phased array (16), then the horizontally polarized light passes through the second half-wave plate (17) to become vertically polarized light, and then the vertically polarized light is reflected by the second polarization beam splitter (18) and the fourth reflector (19), and after sequentially passing through the second cylindrical lens (20), the first spatial wave-filter (21), the first spherical lens (22), the fifth reflector (23), the sixth reflector (24) and first polarization beam splitter (15), it enters the first virtual image phased array (16) again, and sequentially passes through the second half-wave plate (17), the polarization beam splitter (18), the second spherical lens (25), the second spatial wave-filter (26), and the third spherical lens (27) and then enters a fourth beam splitting system, and then a fourth beam splitter (28) in the fourth beam splitting system splits the light beam into two beams, one of which is incident onto a third photodetector (29), and the other one is received by a first ICCD acquisition system (30);
the fifth beam splitting system comprises a fifth beam-splitter (32) and a seventh reflector (34), the fifth beam splitter (32) splits the light beam into two beams, one of which is incident onto a fourth photodetector (33), and the other one is incident onto a second dual-stage virtual image phased array system through the seventh reflector (34);
the second dual-stage virtual image phased array system comprises a third half-wave plate (35), a third cylindrical lens (36), a third polarization beam splitter (37), a second virtual image phased array (38), a fourth half-wave plate (39), a fourth polarization beam splitter (40), an eighth reflector (41), a fourth cylindrical lens (42), a third spatial wave-filter (43), a fourth spherical lens (44), a ninth reflector (45), a tenth reflector (46), a fifth spherical lens (47), a fourth spatial wave-filter (48), and a sixth spherical lens (49); a vertically polarized beam passes through the third half-wave plate (35) to become horizontally polarized light, the horizontally polarized light is incident into the second virtual image phased array (38) after passing through the third cylindrical lens (36) and the third polarization beam splitter (37), then the horizontally polarized light passes through the fourth half-wave plate (39) to become vertically polarized light, and then it is reflected by the fourth polarization beam splitter (40) and the eighth reflector (41), and then sequentially passes through the fourth cylindrical lens (42), the third spatial wave-filter (43), the fourth spherical lens (44), the ninth reflector (45), the tenth reflector (46) and the third polarization beam splitter (37), and then is incident into the second virtual image phased array (38) again, and then it sequentially passes through the fourth half-wave plate (39), the fourth polarization beam splitter (40), the fifth spherical lens (47), the fourth spatial wave-filter (48), and the sixth spherical lens (49), and then enters a sixth beam splitting system;
the sixth beam splitting system comprises a sixth beam-splitter (50), which splits the light beam into two beams, one of which is incident onto a fifth photodetector (51), and the other one is received by a second ICCD acquisition system (52); and
the dual-wavelength high-spectral resolution lidar system further comprises: a computer (53) for displaying and processing, in real time, data received by the first ICCD acquisition system (30) and the second ICCD acquisition system (52); and a timing controller (54) for controlling time delay of the first ICCD acquisition system (30) and the second ICCD acquisition system (52).

2. The dual-wavelength high-spectral resolution lidar system based on a dual-stage virtual image phased array according to claim 1, wherein the dual-wavelength vertically polarized light emission system emits laser light having wavelengths of 488 nm and 532 nm, respectively.

3. The dual-wavelength high-spectral resolution lidar system based on a dual-stage virtual image phased array according to claim 2, wherein the first band-pass filter (9) has a center wavelength of 532 nm, a transmittance larger than 90%, a short-wave cut-off range of 200-512 nm, and a long-wave cut-off range of 552-1200 nm; the second band-pass filter (31) has a center wavelength of 488 nm, a transmittance larger than 90%, a short-wave cut-off range of 200-460 nm, and a long-wave cut-off range of 500-1200 nm.

4. The dual-wavelength high-spectral resolution lidar system based on a dual-stage virtual image phased array according to claim 1, wherein the first virtual image phased array and the second virtual image phased array have a free spectral range of 0-18 GHz.

5. An inversion method based on ocean environment parameters of the lidar system as described in claim 3, wherein the method comprises:

a step S1: receiving, by the second photodetector (12) and at a laser-light receiving channel of 532 nm, a sum of Mie scattering and Rayleigh scattering signal intensity $P_{E1}$ and Brillouin scattering signal intensity $P_{B1}$ of a light beam; receiving, by the third photodetector (29), the Brillouin scattering signal intensity $P_{B1}$; and obtaining the Mie scattering and Rayleigh scattering signal intensity $P_{E1}$ by subtracting the Brillouin scattering signal intensity $P_{B1}$ from the sum of Mie scattering and Rayleigh scattering signal intensity $P_{E1}$ and Brillouin scattering signal intensity $P_{B1}$; and receiving, by the fourth photodetector (33) and at a laser-light receiving channel of 488 nm, a sum of Mie scattering and Rayleigh scattering signal intensity $P_{E2}$ and Brillouin scattering signal intensity $P_{B2}$; receiving, by the fifth photodetector (51), the Brillouin scattering signal intensity $P_{B2}$; and obtaining the Mie scattering and Rayleigh scattering signal intensity $P_{E2}$ by subtracting the Brillouin scattering signal intensity $P_{B2}$ from the sum of Mie scattering and Rayleigh scattering signal intensity $P_{E2}$ and Brillouin scattering signal intensity $P_{B2}$;

a step S2: obtaining an attenuation coefficient $\alpha$ of the lidar signal in sea water for each of the two laser-light receiving channels based on a following calculation formula:

$$P_B(z) = C_B \beta_B^\pi(z) \exp[-2\int_0^z \alpha(z')dz']$$

where, a subscript B represents Brillouin scattering, $\beta_B^\pi$ represents a backward Brillouin scattering coefficient, and $\alpha$ represents an attenuation coefficient of the lidar signal in the sea water; and z represents a detection depth of laser-light;

a step S3: obtaining a backscattering coefficient $\beta_P^\pi$ of suspended particles in the sea water for each of the two laser-light receiving channels based on a following calculation formula:

$$P_E(z) = C_E[\beta_M^\pi(z) + \beta_P^\pi(z)] \exp[-2\int_0^z \alpha(z')dz']$$

where, $C_E$ represents a system constant of an elastic scattering channel, $\beta_M^\pi$ represents a backscattering coefficient of water molecules, and $\beta_P^\pi$ represents a backscattering coefficient of the suspended particles; and a step S4: for each of the two laser-light receiving channels, inverting ocean subsurface information and a phytoplankton vertical layered structure based on a vertical profile of the backscattering coefficient $\beta_P^\pi$ of the suspended particles.

\* \* \* \* \*